United States Patent
Cao et al.

(10) Patent No.: US 9,772,424 B2
(45) Date of Patent: Sep. 26, 2017

(54) HYBRID AMPLITUDE ADJUSTMENT ALGORITHM FOR RESISTIVITY LOGGING TOOLS

(71) Applicant: Halliburton Energy Services, Inc., Houston, TX (US)

(72) Inventors: Qi Cao, Singapore (SG); Chi Wei Lim, Singapore (SG); Alberto Quintero, Singapore (SG); William J. Schaecher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 32 days.

(21) Appl. No.: 15/032,213

(22) PCT Filed: Dec. 30, 2013

(86) PCT No.: PCT/US2013/078347
§ 371 (c)(1),
(2) Date: Apr. 26, 2016

(87) PCT Pub. No.: WO2015/102583
PCT Pub. Date: Jul. 9, 2015

(65) Prior Publication Data
US 2016/0274261 A1    Sep. 22, 2016

(51) Int. Cl.
*G01V 3/00* (2006.01)
*G01V 3/08* (2006.01)
(Continued)

(52) U.S. Cl.
CPC .................................... *G01V 3/20* (2013.01)

(58) Field of Classification Search
CPC ... G01V 3/00; G01V 3/08; G01V 3/18; G01V 3/20; G01V 3/34; G01V 3/40
(Continued)

(56) References Cited

U.S. PATENT DOCUMENTS 3,724,589 A    4/1973  Chapman
3,828,262 A    8/1974  Trocqueme
(Continued)

OTHER PUBLICATIONS

Glover, The Sonic or Acoustic Log, published at least as early as Jun. 17, 2013, 26 pages.
(Continued)

*Primary Examiner* — Arleen M Vazquez
*Assistant Examiner* — Neel Shah
(74) *Attorney, Agent, or Firm* — Kilpatrick Townsend & Stockton LLP (57) ABSTRACT

In one aspect, a resistivity logging tool for a fluid-producing formation if provided. The resistivity logging tool includes at least one transmitter device connected to at least one excitation electrode, multiple receiver devices respectively connected to monitoring electrodes, and a controller. The transmitter can inject an excitation current into the formation via the excitation electrode. Each receiver device can determine a respective voltage level induced by the excitation current. The controller can determine whether a voltage level measured by at least one receiver device is within a specified range. Based on the measured voltage level, the controller can select a global amplitude adjustment algorithm for modifying excitation currents or a localized amplitude adjustment algorithm for modifying one or more gains of one or more receiver devices. The controller can modify the excitation current or gains by executing the selected algorithm.

20 Claims, 5 Drawing Sheets

(51) Int. Cl.
*G01V 3/18* (2006.01)
*G01V 3/20* (2006.01)
*G01V 3/34* (2006.01)
*G01V 3/40* (2006.01)

(58) Field of Classification Search
USPC ............ 324/335, 338, 339, 340, 366, 369
See application file for complete search history.

(56) References Cited

U.S. PATENT DOCUMENTS

| | | | |
|---|---|---|---|
| 4,042,907 A | 8/1977 | Trouiller et al. | |
| 4,172,250 A | 10/1979 | Guignard et al. | |
| 4,282,486 A | 8/1981 | Culver et al. | |
| 4,570,123 A | 2/1986 | Grosso | |
| 4,592,030 A | 5/1986 | Arditty et al. | |
| 4,658,383 A | 4/1987 | Zimmer et al. | |
| 4,736,300 A | 4/1988 | Johnson et al. | |
| 4,855,965 A | 8/1989 | Rambow et al. | |
| 4,999,817 A | 3/1991 | Zimmer et al. | |
| 5,083,124 A | 1/1992 | Nordstrom et al. | |
| 5,094,103 A | 3/1992 | Wicks et al. | |
| 5,339,037 A | 8/1994 | Bonner et al. | |
| 6,646,441 B2 | 11/2003 | Thompson et al. | |
| 7,418,348 B2 | 8/2008 | Woerpel et al. | |
| 7,436,334 B2 | 10/2008 | Savage et al. | |
| 2004/0140091 A1 | 7/2004 | Gupta | |
| 2005/0285751 A1 | 12/2005 | Hall et al. | |
| 2007/0229082 A1 | 10/2007 | Vehra et al. | |
| 2007/0229304 A1* | 10/2007 | Hall ................ | E21B 4/14 340/853.1 |
| 2008/0061225 A1 | 3/2008 | Orban et al. | |
| 2009/0242274 A1 | 10/2009 | Chen et al. | |

OTHER PUBLICATIONS

International Patent Application No. PCT/US2013/078347, International Search Report and Written Opinion, dated Sep. 22, 2014, 9 pages.

* cited by examiner

HYBRID AMPLITUDE ADJUSTMENT ALGORITHM FOR RESISTIVITY LOGGING TOOLS

CROSS-REFERENCE TO RELATED APPLICATIONS

This is a U.S. national phase under 35 U.S.C. 371 of International Patent Application No. PCT/US2013/078347, titled "Hybrid Amplitude Adjustment Algorithm for Resistivity Logging Tools" and filed Dec. 30, 2013, which is incorporated herein by reference in its entirety.

TECHNICAL FIELD

The present disclosure relates generally to devices for use in a wellbore in a subterranean formation and, more particularly (although not necessarily exclusively), to a hybrid amplitude adjustment algorithm for resistivity logging tools.

BACKGROUND

Various devices can be utilized in a well traversing a hydrocarbon-bearing subterranean formation. In some well systems, wireline resistivity logging tools or other resistivity logging tools can determine the resistivity of a geological formation from which hydrocarbons are extracted. Determining the resistivity of the geological formation may involve transmitting electrical signals into the formation, detecting returns of the electrical signals, and calculating the resistivity based on the voltage amplitudes of the returned signals.

For some geological formations, the voltages of the returned signals have low amplitudes. For example, electrical voltages may have lower amplitudes (e.g., a few nanovolts) that are less than the electrical noise and environmental noise measured at the output of the amplifiers of the receiver devices. A resistivity logging tool may not be able to detect returned signals having low voltage amplitudes.

DETAILED DESCRIPTION

Certain aspects and examples of the disclosure herein are directed to a hybrid amplitude adjustment algorithm for resistivity logging tools.

A hybrid amplitude adjustment algorithm can be used for configuring one or more transmitter devices or one or more receiver devices of a resistivity logging tool, such as a wireline resistivity tool. The resistivity logging tool can inject excitation currents into a formation, determine voltages induced in the formation by the injected excitation currents, and determine the resistivity of the formation. The hybrid amplitude adjustment algorithm can be used to configure the excitation current levels used by transmitter devices or the gains used by the receiver devices. The hybrid amplitude adjustment algorithm can include two levels of amplitude adjustments. A first level of amplitude adjustment can be a global amplitude adjustment algorithm. The global amplitude adjustment algorithm can modify the excitation current level of electrical signals transmitted into the formation from the transmitter devices. A second level of amplitude adjustment can be a localized amplitude adjustment algorithm. The localized amplitude adjustment algorithm can configure the gains for local amplifiers included in receiver devices of the resistivity logging tool. The resistivity logging tool can select between the global amplitude adjustment algorithm and the localized amplitude adjustment algorithm based on the amplitude of electrical signals received from a formation. The hybrid amplitude adjustment algorithm can allow resistivity logging tools to detect and process electrical signal levels with low amplitudes, such as electrical signals having amplitudes of a few nanovolts.

These illustrative examples are given to introduce the reader to the general subject matter discussed here and are not intended to limit the scope of the disclosed concepts. The foregoing sections describe various additional aspects and examples with reference to the drawings in which like numerals indicate like elements, and directional descriptions are used to describe the illustrative aspects. Like the illustrative aspects, the numerals and directional descriptions included in the following sections should not be used to limit the disclosed concepts.

Figure 1:
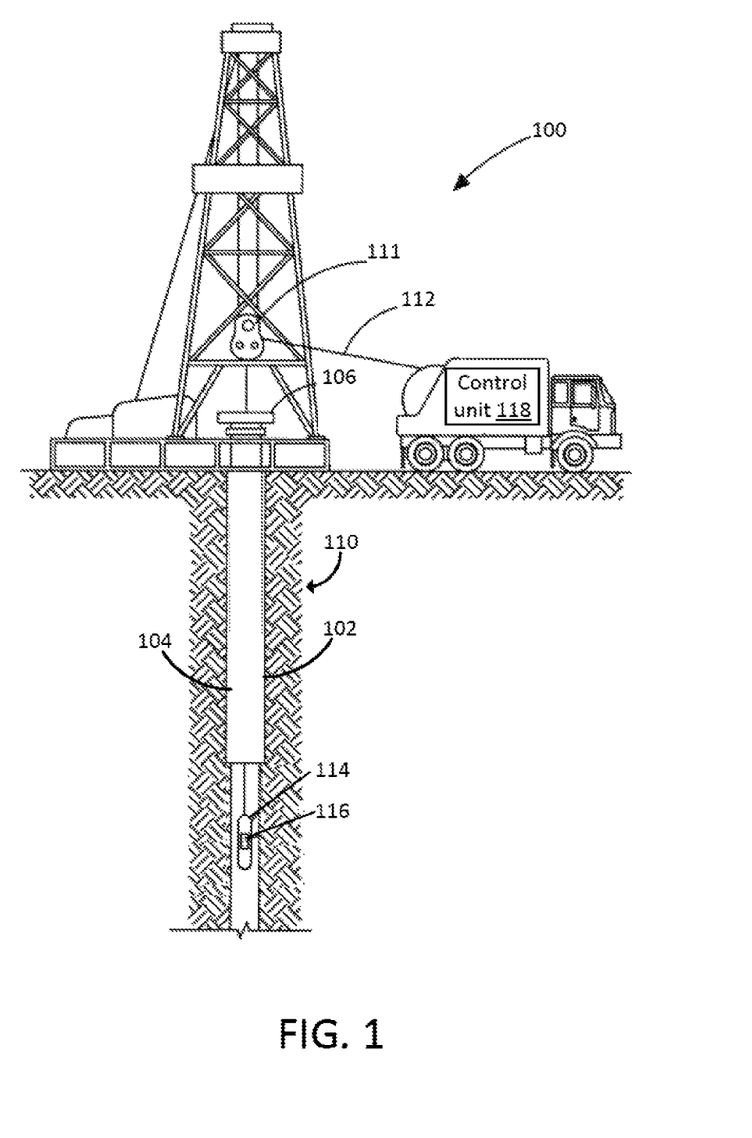
FIG. 1 is a schematic diagram of an example of a well system in which a resistivity logging tool can be deployed to one aspect of the present disclosure.

FIG. 1 is a schematic diagram of an example of a well system 100 in which a resistivity logging tool 114 can be deployed. The well system 100 includes a wellbore 102 extending through various earth strata. The wellbore 102 extends through a hydrocarbon bearing subterranean formation 110. A casing string 104 extends from the surface 106 to the subterranean formation 110. The casing string 104 can provide a conduit via which formation fluids, such as production fluids produced from the subterranean formation 110, can travel from the wellbore 102 to the surface 106.

The well system 100 can also include at least one resistivity logging tool 114. The resistivity logging tool 114 coupled to a cable 112 can be deployed into the wellbore 102 using a winch 111. The resistivity logging tool 114 can be used to determine the resistivity of a formation 110. The resistivity logging tool 114 can include a controller 116 for controlling operations of the resistivity logging tool 114. The resistivity logging tool 114 can be communicatively coupled to a control unit 118 at the surface of the well system 100. A non-limiting example of a control unit 118 is a computing device such as desktop computer or other suitable computing device. The control unit 118 can process data received from the resistivity logging tool 114 to determine characteristics of the formation 110.

In some aspects, the resistivity logging tool 114 can be disposed in more complex wellbores, such as wellbores having a substantially vertical section and a substantially horizontal section. Although FIG. 1 depicts a single resistivity logging tool 114 deployed in the wellbore 102, any number of resistivity logging tools can be deployed in the well system 100.

Figure 2:
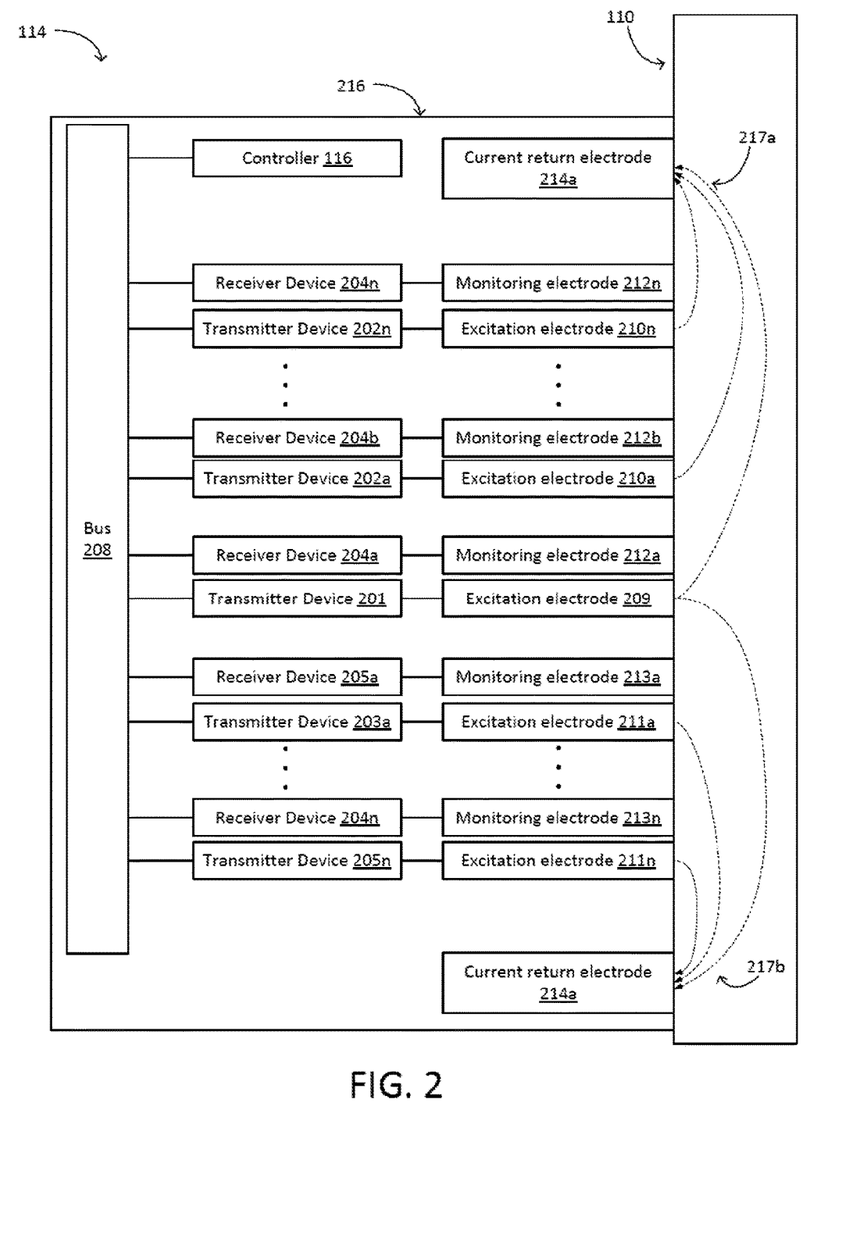
FIG. 2 is a block diagram of an example of a resistivity logging tool according to one aspect of the present disclosure.

FIG. 2 is a block diagram of an example of a resistivity logging tool 114 according to one aspect. The resistivity logging tool can include the controller 116, multiple transmitter devices 201, 202a-n, 203a-n, multiple receiver devices 204a-n, 205a-n, a bus 208, multiple excitation electrodes 209, 210a-n, 211a-n, and multiple monitoring electrodes 212a-n, 213a-n. The controller 116, the transmitter devices 201, 202a-n, 203a-n, the receiver devices 204a-n, 205a-n, the bus 208, the excitation electrodes 209, 210a-n, 211a-n, and the monitoring electrodes 212a-n, 213a-n can be positioned in a chassis 216.

The resistivity logging tool 114 can include a mirror section. The mirror section can include mirror electrodes, transmitter devices, and receiver devices at an opposite side of the excitation electrode 209. Each of the transmitter devices 202a-n can be associated with a corresponding one of the mirror transmitter devices 203a-n at an opposite side of the excitation electrode 209. The transmitter device 201 can be connected to the excitation electrode 209, the transmitter devices 202a-n can be respectively connected to excitation electrodes 210a-n and the transmitter devices 203a-n can be respectively connected to mirror excitation electrodes 211a-n. Each of the receiver devices 204a-n can be associated with a corresponding one of the mirror receiver devices 205a-n at an opposite side of the excitation electrode 209. The receiver devices 204a-n can be respectively connected to monitoring electrodes 212a-n and the receiver devices 205a-n can be respectively connected to mirror monitoring electrodes 213a-n.

The current return electrode 214a can have a voltage such that excitation currents injected into the formation 110 from the excitation electrodes 209, 210a-n are returned from the formation 110 via the current return electrode 214a, as depicted by the current flow lines 217a. The current return electrode 214b can have a voltage such that excitation currents injected into the formation 110 from the excitation electrodes 209, 211a-n are returned from the formation 110 via the current return electrode 214b, as depicted by the current flow lines 217b. For example, the current return electrodes may be electrically connected to ground or to another voltage level lower than the voltages at the excitation electrodes 209, 210a-n, 211a-n.

The controller 116 can receive data from the receiver devices 204a-n, 205a-n, process data from the receiver devices 204a-n, 205a-n, and transmit the results of data processing to a control unit 118 at the surface of the well system 100. The controller 116 can also configure the excitation current levels used by the transmitter devices 202a-n.

The controller 116 can communicate with the transmitter devices 201, 202a-n, 203a-n and the receiver devices 204a-n, 205a-n via a controller area network ("CAN") bus 208 or other suitable interface. The CAN bus 208 or other suitable interface can allow digital communication of data among controller 116, the transmitter devices 201, 202a-n, 203a-n, and the receiver devices 204a-n, 205a-n. The CAN bus 208 can reduce or eliminate the use of long signal wires inside a packed mechanical chassis for connecting a controller to receiver devices and transmitter devices. Using long signal wires for transmitting signals of receiver devices and transmitter devices may increase crosstalk interference among the receiver devices and the transmitter devices. The CAN bus 208 can reduce or eliminate such interference.

Figure 3:
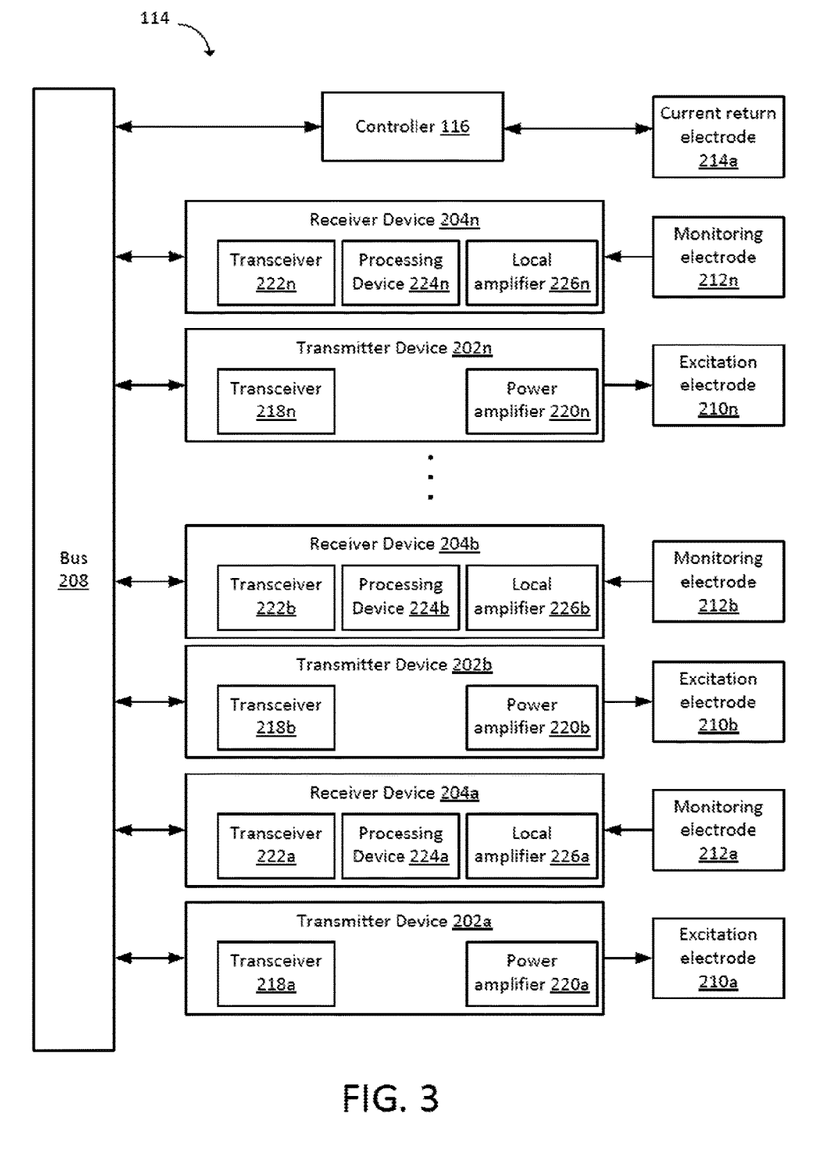
FIG. 3 is a block diagram of the resistivity logging tool of FIG. 2 in additional detail according to one aspect of the present disclosure.

FIG. 3 is a block diagram depicting additional details of the transmitter devices 202a-n and the receiver devices 204a-n. Although FIG. 3 depicts the transmitter devices 202a-n and the receiver devices 204a-n for illustrative purposes only, the transmitter devices 201, 203a-n and the receiver devices 205a-n can include the same components as the transmitter devices 202a-n and the receiver devices 204a-n.

The transmitter devices 202a-n can respectively include transceivers 218a-n and tunable power amplifiers 220a-n. Each of the transmitter devices 202a-n can transmit electrical signals (i.e., excitation currents) into a downhole geological formation 110 via the excitation electrodes 210a-n. The power amplifiers 220a-n can be used to modify the excitation current levels for electrical signals transmitted by the transmitter devices 202a-n. The magnitude of the excitation currents injected into the formation 110 can be controlled by tuning or otherwise modifying the gains of the power amplifiers 220a-n for the transmitter devices 202a-n. The transceivers 218a-n can be used for communicating with the controller 116 via the CAN bus 208.

Each of the receiver devices 204a-n can detect electrical signals induced in the formation 110 by the excitation currents. The electrical signals induced in the formation 110 can be detected via the monitoring electrodes 212a-n. Detecting the electrical signals can include measuring a voltage induced in the formation 110 by an excitation current injected by one of the transmitter devices 202a-n. The induced voltage can be measured via monitoring electrodes 212a-n connected to respective receiver devices 204a-n.

The receiver devices 204a-n can respectively include transceivers 222a-n, processing devices 224a-n, and tunable local amplifiers 226a-n. The local amplifiers 226a-n can amplify respective amplitudes of respective electrical signals received from the formation 110 via respective monitoring electrodes 212a-n. Each of the processing devices 224a-n can be an onboard central processing unit ("CPU") or other suitable processing device. Each of the processing devices 224a-n can include one or more analog-to-digital converters and digital signal processing hardware or software. Each of the processing devices 224a-n can sample voltage data from electrical signals received by a respective monitoring electrode and corresponding to voltages induced in the formation 110 by the excitation currents. Each of the processing devices 224a-n can process the sampled voltage data in order to determine a respective voltage level of a respective electrical signal received via a respective monitoring electrode connected to a respective one of the receiver devices 204a-n. In some aspects, each of the processing devices 224a-n can perform digital filtering of electrical signals corresponding to the detected voltages. The digital filtering can reduce noise on the received electrical signals. The transceivers 222a-n can be used to communicate with the controller 116 via the bus 208. The receiver devices 204a-n can transmit digital data to the controller 116 via the respective transceivers 222a-n. The digital data can describe or otherwise indicate the voltage level or other attributes of received electrical signals.

The controller 116 can control the levels of the excitation currents used by the transmitter devices 202a-n. The controller 116 can include one or more electronic devices implemented using a printed circuit board ("PCB"). The controller 116 can configure the transmitter devices 202a-n by digitally tuning the power amplifiers 220a-n. The controller 116 can digitally tune the power amplifiers 220a-n by communicating control signals via the CAN bus 208 or other suitable interface to the transceiver modules of the transmitter devices 202a-n.

In a logging operation, the transmitter devices 202a-n can be respectively connected to excitation electrodes 210a-n. The excitation electrodes 210a-n can be used to inject, drive, or otherwise provide the excitation currents to the formation 110. Each of the transmitter devices 202*a-n* can transmit a respective electrical signal by injecting, driving, or otherwise providing a respective excitation current to the formation 110. The excitation currents are returned from the formation 110 via current return electrodes 214*a*, 214*b*. The excitation currents can induce voltages in the formation 110. Each receiver device 204*a-n* can detect, process, and calculate or otherwise determine voltages measured across a respective monitoring electrode. Each receiver device 204*a-n* can communicate data results describing or otherwise indicating the voltage values to the controller 116 via the CAN bus 208 or other suitable interface. The controller 116 can calculate or otherwise determine a resistivity of the formation 110 based on the excitation current values used by the transmitter circuits and the corresponding measured voltage values detected by receiver device 204*a-n*.

The controller 116 can perform time synchronization among the receiver devices 204*a-n*. The time synchronization can phase align and phase lock the sampling performed by each CPU or other processing device to transmitted electrical signals transmitted by the transmitter devices 202*a-n*. The controller 116 can perform the time synchronization by communicating control signals for implementing a time synchronization scheme to the receiver devices 204*a-n* via the CAN bus 208 or other suitable interface.

For some environments, the signal levels of the received electrical signals can be small (e.g., on the order of a few nanovolts ("nV")). Signals with small amplitudes may be too small to be accurately detected by the receiver devices. In some resistivity logging tools, receiver devices can include feedback mechanisms to control power amplifiers of the transmitter devices. The feedback mechanisms can cause power amplifiers of the transmitter devices to increase the excitation current levels based on the signal level of the received electrical signals being too low to measure. The feedback mechanisms can cause the transmitter devices to decrease excitation current levels if the signal level of the received electrical signals are too large to measure.

A global amplitude adjustment algorithm can be executed by the controller 116 to configure the transmitter devices to inject excitation currents having higher magnitudes. Increasing electrical current magnitudes (e.g., up to 1 ampere or more) can cause amplitudes of electrical signals received by the receiver devices to reach levels higher than tens or hundreds of nanovolts. Increasing the excitation currents to excessive levels can increase power consumption and power dissipation by the resistivity logging tool 114. Increasing power consumption and power dissipation can shorten the life of electronic components exposed to higher temperatures, currents, and voltages.

Figure 4:
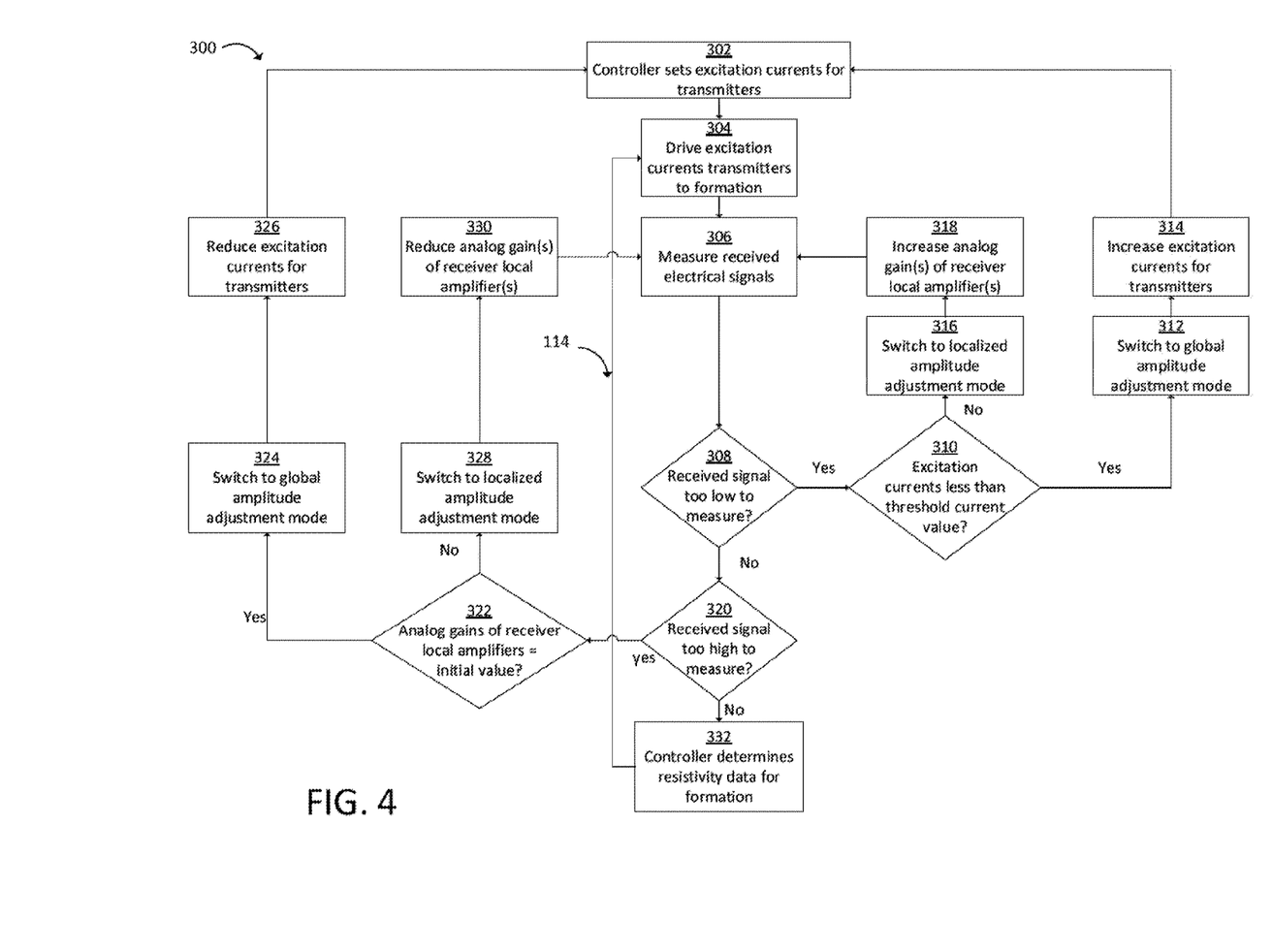
FIG. 4 is a flow chart depicting a hybrid amplitude adjustment algorithm for a downhole logging operation according to one aspect of the present disclosure.

A hybrid adjustment algorithm can be used to reduce or eliminate problems associated with using a global adjustment algorithm. For example, FIG. 4 is a flow chart depicting a hybrid amplitude adjustment algorithm 300 for a resistivity logging operation according to one aspect. The hybrid amplitude adjustment algorithm 300 can be executed using the wireline resistivity tool 114 depicted in FIGS. 2-3. Although FIG. 3 describes the hybrid amplitude adjustment algorithm 300 with respect to the transmitter devices 202*a-n* and the receiver devices 204*a-n* for illustrative purposes only, the hybrid amplitude adjustment algorithm 300 can also be executed for the transmitter devices 201, 203*a-n* and the receiver devices 205*a-n* having the same or similar components as the transmitter devices 202*a-n* and the receiver devices 204*a-n*. Other implementations are possible.

At block 302, the controller 116 of the resistivity logging tool 114 can set excitation currents for the transmitter devices 202*a-n*. For example, the controller 116 can set excitation current levels for the transmitter devices 202*a-n* by digitally tuning the power amplifiers 220*a-n* of the transmitter devices 202*a-n*. In some aspects, each of the transmitter devices 202*a-n* can be configured to transmit electrical signals by injecting, driving, or otherwise driving a respective excitation current having a common or different magnitude for each of the transmitter devices 202*a-n*.

At block 304, the transmitter devices 202*a-n* can drive, inject, or otherwise provide the excitation currents to the formation 110. The excitation currents can induce voltages in the formation 110. In some aspects, different resistivity values at different positions in the formation 110 can cause at least some of the induced voltages to have different magnitudes from one another.

At block 306, the receiver devices 204*a-n* can measure the amplitudes of the induced electrical signals received from the formation 110. The electrical signals received from the formation 110 can be caused by or otherwise correspond to the voltages induced in the formation 110 by the excitation currents.

At block 308, the controller 116 can determine whether the received signals have amplitudes with magnitudes too small to measure. The controller 116 can determine that one or more of the received electrical signals have amplitudes with magnitudes that are too small to be accurately measured by one or more of the receiver devices 204*a-n*.

The receiver devices 204*a-n* can be configured to measure any suitable range of electrical signal levels within measurable ranges of amplitudes.

If the received signals have amplitudes with magnitudes too small to measure, the controller 116 can determine whether the excitation currents are less than a threshold current value, as depicted at block 310. The threshold current value for the excitation current can be used to determine which algorithm between the global amplitude adjustment algorithm and the localized amplitude adjustment algorithm is to be executed for resistivity logging tool operations. The threshold current value can also be used to reduce power consumption by the resistivity logging tool 114 or reduce crosstalk interference generated by communication within the mechanical chassis 216 of the resistivity logging tool 114. The threshold current value for the excitation current can be selected based on lab measurements or other suitable means. In a non-limiting example, the threshold current value for the excitation current can be selected to reduce crosstalk to a 10% error margin or less.

In some aspects, the threshold current value can be modified by the controller 116 based on characteristics of different formations. Modifying the threshold current value can optimize power consumption and measurement resolution of the resistivity logging tool 114. For example, a table or other data file can be stored in a memory device of the controller 116. The table or other data file can associate different threshold current values with different formations or different characteristics of different formations. The controller 116 can select a suitable threshold current value based on the characteristics of the formation 110.

If the excitation currents are less than a threshold current value, the resistivity logging tool 114 can switch to a global amplitude adjustment mode, as depicted at block 312. The excitation currents of the transmitter devices 202*a-n* can be increased, as depicted at block 314. The controller 116 can configure the transmitter devices 202*a-n* to increase the excitation currents to amplitudes greater than or equal to the amplitudes of the signals received from the formation 110. The algorithm 300 can return to block 302.

If the excitation currents are not less than a threshold current value, the resistivity logging tool 114 can switch to a local amplitude adjustment mode, as depicted at block 316. The analog gains of one or more local amplifiers 226a-n of one or more receiver devices 204a-n can be increased, as depicted at block 318. The local amplitude adjustment algorithm can be executed to modify the analog gains of local amplifiers 226a-n in receiver devices 204a-n. The analog gains of local amplifiers 226a-n can be increased to match the amplitudes of the signals received from the formation 110. The localized amplitude adjustment algorithm can be used to tune signals amplitudes for cases in which the excitation current is at the threshold current value.

The localized amplitude adjustment algorithm can increase the low-level electrical signal amplitudes to a measurable range by adjusting the amplitudes of signals processed by the receiver devices 204a-n. The localized amplitude adjustment algorithm can increase the ability of the resistivity logging tool 114 to detect the electrical signals without increasing the excitation currents. Increasing the ability of the resistivity logging tool 114 to detect the electrical signals without increasing the excitation currents can reduce or prevent crosstalk interference to other nearby signal wires inside the chassis 216. The analog gain of the tunable local amplifier can be modified using a respective one of the processing devices 224a-n on each receiver device 204a-n. Once the analog gains have been increased, the algorithm 300 can return to block 306.

In some aspects, each of the receiver devices 204a-n can independently configure the gain of a respective local amplifier of a respective one of the receiver devices 204a-n. For example, different receiver devices 204a-n connected to different monitoring electrodes 212a-n at different positions on the formation 110 can be configured with different gains for respective local amplifiers 226a-n. For example, the analog gains of one or more local amplifiers 226a-n can be increased such that the signals received by one or more receiver devices 204a-n are amplified. The localized amplitude adjustment algorithm can also include digital filtering implemented by one or more of the processing devices 224a-n to reduce or eliminate noise generated by increasing gains of the local amplifiers 226a-n.

In some aspects, each of the receiver devices 204a-n can implement digital filtering schemes to discriminate, select, and measure the voltage of the received electrical signals accurately. The processing devices 224a-n can compensate the corresponding analog gains at end of the measurement. The compensated and scaled result values can be recorded and provided to the controller 116 for resistivity calculations.

If the received signals do not have amplitudes with magnitudes too small to measure, the controller 116 can determine whether the received signals have amplitudes with magnitudes too large to measure, as depicted at block 320. In some aspects, one or more CPU's or other suitable processing devices of one or more receiver devices 204a-n can determine whether the received signals have amplitudes with magnitudes too large to measure.

If the received signals have amplitudes with magnitudes too large to measure, the controller 116 can determine whether the analog gains of the local amplifiers 226a-n of the receiver devices 204a-n are set to initial configuration values, as depicted at block 322. The controller 116 can communicate with a respective one of the receiver devices 204a-n via the CAN bus 208 or other suitable interface to determine whether the analog gains of the local amplifiers 226a-n of the receiver devices 204a-n are set to initial configuration values.

If the analog gains of the local amplifiers 226a-n of the receiver devices 204a-n are set to initial configuration values, the resistivity logging tool 114 is set to a global amplitude adjustment mode, as depicted at block 324. The excitation currents for the transmitter devices 202a-n can be reduced, as depicted at block 326. The controller 116 can decrease the excitation currents generated by the transmitter devices 202a-n in order to reduce the level of the signals received by one or more receiver devices 204a-n. The algorithm 300 can return to block 302.

If the analog gains of the local amplifiers 226a-n of the receiver devices 204a-n are not set to initial configuration values, the resistivity logging tool 114 is set to a local amplitude adjustment mode, as depicted at block 328. The analog gains for one or more local amplifiers 226a-n of one or more receiver devices 204a-n can be reduced, as depicted at block 330. In some aspects, the onboard CPU's or other suitable processing devices of the receiver devices 204a-n can decrease the analog gains of the local amplifiers 226a-n such that the initial analog gain settings from the global amplitude adjustment algorithm are used. The algorithm 300 can return to block 302.

If the received signals do not have amplitudes with magnitudes too large to measure, the controller 116 can calculate or otherwise determine the resistivity for the formation 110 based on excitation currents of the transmitter devices 202a-n and measured electrical voltages at receiver devices 204a-n, as depicted at block 332. The algorithm 300 can return to block 304.

Using a hybrid amplitude adjustment algorithm can allow the downhole tools to detect and process small electrical signal levels having amplitudes on the order of a few nanovolts. Using a hybrid amplitude adjustment algorithm can reduce power consumption and power dissipation of the resistivity logging tool. Using a hybrid amplitude adjustment algorithm can increase the life of electronic components of a downhole power tool. Using a hybrid amplitude adjustment algorithm can also reduce or eliminate crosstalk resulting from bundling multiple wires together to route signals within the mechanical chassis.

Figure 5:
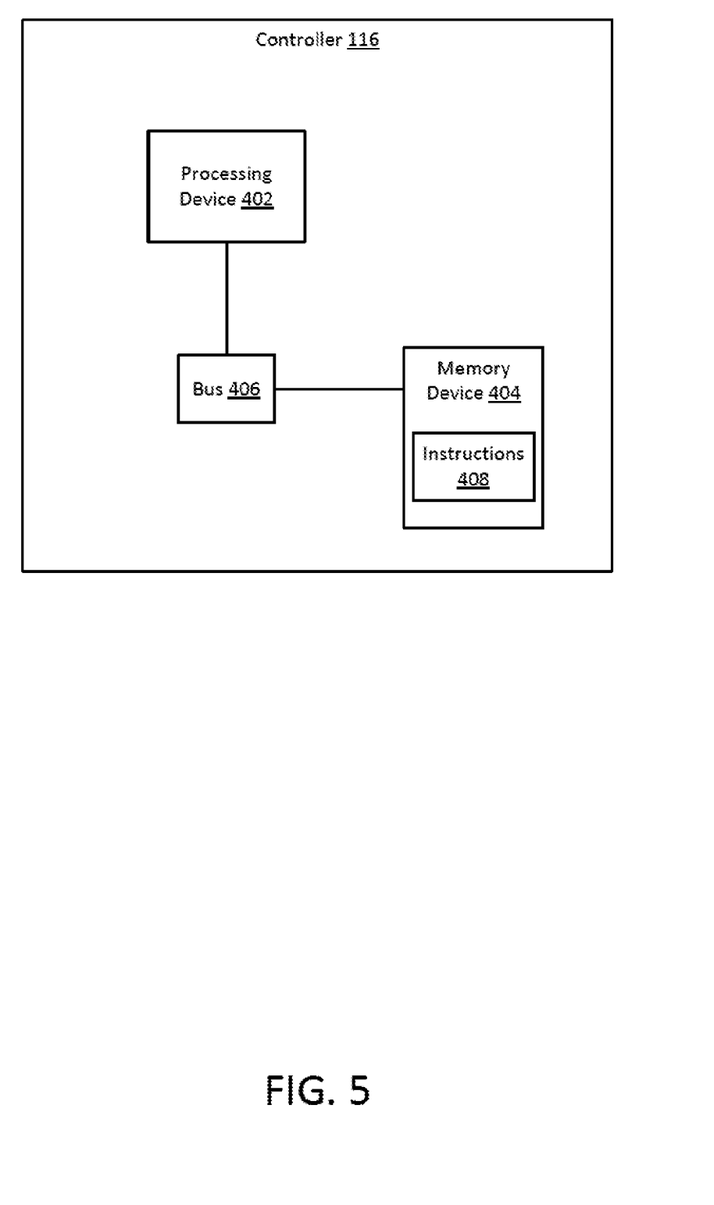
FIG. 5 is a block diagram depicting an example of a controller for a resistivity logging tool according to one aspect of the present disclosure.

FIG. 5 is a block diagram depicting an example of a controller 116 for a resistivity logging tool 114. The controller 116 includes a processing device 402, a memory device 404, and a bus 406.

The processing device 402 can execute one or more operations related to resistivity logging operations of the resistivity logging tool 114. The processing device 402 can execute instructions 408 stored in the memory device 404 to perform the operations. The processing device 402 can include one processing device or multiple processing devices. Non-limiting examples of the processing device 402 include a Field-Programmable Gate Array ("FPGA"), an application-specific integrated circuit ("ASIC"), a microprocessor, etc.

The processing device 402 can be communicatively coupled to the memory device 404 via the bus 406. The non-volatile memory device 404 may include any type of memory device that retains stored information when powered off. Non-limiting examples of the memory device 404 include electrically erasable programmable read-only memory ("ROM"), flash memory, or any other type of non-volatile memory. In some aspects, at least some of the memory device 404 can include a medium from which the processing device 402 can read instructions. A computer-readable medium can include electronic, optical, magnetic, or other storage devices capable of providing the processing device 402 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

In some aspects of the present disclosure, a resistivity logging tool is provided for being disposed in a fluid-producing formation. The resistivity logging tool can include at least one transmitter device connected to at least one excitation electrode, receiver devices respectively connected to monitoring electrodes, and a controller in communication with the transmitter device and the receiver devices. In some aspects, the resistivity logging tool can include an interface for communicating digital data among the controller, the transmitter device, and the receiver devices. The interface can include a controller area network bus. The transmitter can inject an excitation current into the formation via the excitation electrode. Each receiver device can include a respective processing device in communication with a respective memory device. Each memory device can store instructions that can be executed by a respective processing device. The instructions can be executed to determine a respective voltage level induced by the excitation current. The voltage level can be determined based on voltage data sampled from a respective monitoring electrode of a respective receiver device. The controller can communicate with a memory device in which instructions executable by the controller are stored. The instructions can be executed to perform multiple operations. The operations include determining whether a voltage level measured by at least one receiver device of the receiver devices is within a specified range. The operations also involve selecting, based on the measured voltage level, at least one of a global amplitude adjustment algorithm for modifying the excitation current and a localized amplitude adjustment algorithm for modifying at least one gain of the receiver device. The operations also involve modifying at least one of the excitation current and the gain by executing the selected algorithm. In some aspects, the instructions for determining whether the voltage level is within the specified range can include instructions for determining that the voltage level is too low to be measured. The instructions for selecting the global amplitude adjustment algorithm can include instructions for determining that the excitation current is below a threshold excitation current. The instructions for selecting the localized amplitude adjustment algorithm can include instructions for determining that the excitation current is at the threshold excitation current. In other aspects, the instructions for determining whether the voltage level is within the specified range can include instructions for determining that the voltage level is too high to be measured. The instructions for selecting the global amplitude adjustment algorithm can include instructions for determining that respective analog gains of respective local amplifiers of the receiver devices are set to initial configuration values. The instructions for selecting the localized amplitude adjustment algorithm can include instructions for determining that the respective analog gains of the respective local amplifiers of the receiver devices are set to values other than the initial configuration values.

In other aspects, a method is provided. The method involves a transmitter device injecting an excitation current into a formation. The method also involves determining whether a voltage level induced by the excitation current and measured by at least one receiver device is within a specified range. The method also involves selecting, based on the measured voltage level, at least one of a global amplitude adjustment algorithm for modifying the excitation current and a localized amplitude adjustment algorithm for modifying at least one gain of the receiver device. The method also involves modifying at least one of the excitation current and the gain by executing the selected algorithm. In some aspects, determining whether the voltage level is within the specified range can include determining that the voltage level is too low to be measured. Selecting the global amplitude adjustment algorithm can include determining that the excitation current is below a threshold excitation current. Selecting the localized amplitude adjustment algorithm can include determining that the excitation current is at the threshold excitation current. In other aspects, determining whether the voltage level is within the specified range can include determining that the voltage level is too high to be measured. Selecting the global amplitude adjustment algorithm can include determining that an analog gain of a local amplifier of the receiver device is set to an initial configuration value. Selecting the localized amplitude adjustment algorithm can include determining that the analog gain of the local amplifier is set to a value other than the initial configuration value.

In other aspects, a controller is provided. The controller can include a processing device and a memory device in which instructions executable by the processing device are stored. The instructions can be executed by the processing device to perform operations. The operations include determining whether a voltage level measured by a receiver device of a resistivity logging tool is within a specified range. The operations also include selecting, based on the measured voltage level, at least one of a global amplitude adjustment algorithm for modifying an excitation current of a transmitter device of the resistivity logging tool and a localized amplitude adjustment algorithm for modifying a gain of the receiver device. The operations also include modifying at least one of the excitation current and the gain by executing the selected algorithm.

The foregoing description of the disclosure, including illustrated aspects and examples has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each disclosed example can be combined with any other example.

What is claimed is:

1. A resistivity logging tool for being disposed downhole, the resistivity logging tool comprising:
   at least one transmitter device connected to at least one excitation electrode and operable to inject an excitation current into the formation via the at least one excitation electrode;
   a plurality of receiver devices respectively connected to a plurality of monitoring electrodes, wherein each receiver device comprises a respective processing device in communication with a respective memory device in which instructions executable by the respective processing device are stored, wherein the instructions comprise instructions for determining a respective voltage level induced by the excitation current based on voltage data sampled from a respective monitoring electrode; and a controller in communication with the at least one transmitter device and the plurality of receiver devices, the controller in communication with a memory device in which instructions executable by the controller are stored, wherein the instructions comprise:

instructions for determining whether a voltage level measured by at least one receiver device of the plurality of receiver devices is within a specified range, instructions for selecting, based on the measured voltage level, at least one of a global amplitude adjustment algorithm for modifying the excitation current and a localized amplitude adjustment algorithm for modifying at least one gain of the at least one receiver device, and instructions for modifying at least one of the excitation current and the at least one gain by executing the selected algorithm.

2. The resistivity logging tool of claim 1, wherein the instructions for determining whether the voltage level is within the specified range comprise instructions for determining that the voltage level is too low to be measured.

3. The resistivity logging tool of claim 2,
wherein the instructions for selecting the global amplitude adjustment algorithm comprise instructions for determining that the excitation current is below a threshold excitation current; and
wherein the instructions for selecting the localized amplitude adjustment algorithm comprise instructions for determining that the excitation current is at the threshold excitation current.

4. The resistivity logging tool of claim 3, wherein the threshold excitation current comprises an excitation current value sufficient to prevent crosstalk interference between components of the resistivity logging tool from exceeding a threshold signal power.

5. The resistivity logging tool of claim 1, wherein the instructions for determining whether the voltage level is within the specified range comprise instructions for determining that the voltage level is too high to be measured.

6. The resistivity logging tool of claim 5,
wherein the instructions for selecting the global amplitude adjustment algorithm comprise instructions for determining that respective analog gains of respective local amplifiers of the plurality of receiver devices are set to initial configuration values;
wherein the instructions for selecting the localized amplitude adjustment algorithm comprise instructions for determining that the respective analog gains of the respective local amplifiers of the plurality of receiver devices are set to values other than the initial configuration values.

7. The resistivity logging tool of claim 1, further comprising an interface operable for communicating digital data among the controller, the at least one transmitter device, and the plurality of receiver devices.

8. The resistivity logging tool of claim 7, wherein the interface comprises a controller area network bus.

9. A method comprising:
injecting, by a transmitter device, an excitation current into a formation;

determining whether a voltage level induced by the excitation current and measured by at least one receiver device is within a specified range;

selecting, based on the measured voltage level, at least one of a global amplitude adjustment algorithm for modifying the excitation current and a localized amplitude adjustment algorithm for modifying at least one gain of the at least one receiver device; and modifying at least one of the excitation current and the at least one gain by executing the selected algorithm.

10. The method of claim 9, wherein determining whether the voltage level is within the specified range comprises determining that the voltage level is too low to be measured.

11. The method of claim 10,
wherein selecting the global amplitude adjustment algorithm comprises determining that the excitation current is below a threshold excitation current; and
wherein selecting the localized amplitude adjustment algorithm comprises determining that the excitation current is at the threshold excitation current.

12. The method of claim 11, wherein the threshold excitation current comprises an excitation current value sufficient to prevent crosstalk interference between components of a resistivity logging tool in which the transmitter device and the at least one receiver device are disposed from exceeding a threshold signal power.

13. The method of claim 9, wherein determining whether the voltage level is within the specified range comprises determining that the voltage level is too high to be measured.

14. The method of claim 13,
wherein selecting the global amplitude adjustment algorithm comprises determining that an analog gain of a local amplifier of the receiver device is set to an initial configuration value;
wherein selecting the localized amplitude adjustment algorithm comprises determining that the analog gain of the local amplifier is set to a value other than the initial configuration value.

15. A controller comprising:
a processing device,
a memory device in which instructions executable by the processing device are stored, wherein the instructions comprise:
instructions for determining whether a voltage level measured by a receiver device of a resistivity logging tool is within a specified range,
instructions for selecting, based on the measured voltage level, at least one of a global amplitude adjustment algorithm for modifying an excitation current of a transmitter device of the resistivity logging tool and a localized amplitude adjustment algorithm for modifying a gain of the receiver device, and
instructions for modifying at least one of the excitation current and the gain by executing the selected algorithm.

16. The controller of claim 15, wherein the instructions for determining whether the voltage level is within the specified range comprise instructions for determining that the voltage level is too low to be measured.

17. The controller of claim 16,
wherein the instructions for selecting the global amplitude adjustment algorithm comprise instructions for determining that the excitation current is below a threshold excitation current;

wherein the instructions for selecting the localized amplitude adjustment algorithm comprise instructions for determining that the excitation current is at the threshold excitation current.

18. The controller of claim 17, wherein the threshold excitation current comprises an excitation current value sufficient to prevent crosstalk interference between components of the resistivity logging tool from exceeding a threshold signal power.

19. The controller of claim 15, wherein the instructions for determining whether the voltage level is within the specified range comprise instructions for determining that the voltage level is too high to be measured.

20. The controller of claim 19,
wherein the instructions for selecting the global amplitude adjustment algorithm comprise instructions for determining that an analog gain of a local amplifier of the receiver device is set to an initial configuration value; and
wherein the instructions for selecting the localized amplitude adjustment algorithm comprise instructions for determining that the analog gain of the local amplifier is set to a value other than the initial configuration value.

* * * * *